(12) United States Patent
Peters

(10) Patent No.: US 8,505,378 B2
(45) Date of Patent: Aug. 13, 2013

(54) ORBITAL BALL FLOWMETER FOR GAS AND FLUID

(76) Inventor: Marcel Leonardus Joseph Petrus Peters, HG Elst (NL)

( * ) Notice: Subject to any disclaimer, the term of this patent is extended or adjusted under 35 U.S.C. 154(b) by 0 days.

(21) Appl. No.: 12/421,689

(22) Filed: Apr. 10, 2009

(65) Prior Publication Data
US 2010/0257929 A1  Oct. 14, 2010

Related U.S. Application Data

(63) Continuation of application No. PCT/NL2007/000248, filed on Oct. 2, 2007.

(30) Foreign Application Priority Data

Oct. 10, 2006  (NL) ..................... 1032652

(51) Int. Cl.
*G01F 3/08* (2006.01)
(52) U.S. Cl.
USPC .......................................................... 73/255
(58) Field of Classification Search
None
See application file for complete search history.

(56) References Cited

U.S. PATENT DOCUMENTS

| 3,381,531 A | * | 5/1968 | Arutjunov et al. | 73/202 |
| 3,443,432 A | * | 5/1969 | Ivanov et al. | 73/861.32 |
| 3,884,069 A | * | 5/1975 | Lind | 73/861.32 |
| 4,089,220 A | | 5/1978 | Houlberg | |
| 4,819,577 A | * | 4/1989 | Campau | 116/264 |
| 5,226,329 A | * | 7/1993 | Peters | 73/861.33 |
| 5,905,200 A | * | 5/1999 | Eldridge et al. | 73/202 |

FOREIGN PATENT DOCUMENTS

| DE | 29 10 387 | 9/1980 |
| NL | 1013231 | 4/2001 |

* cited by examiner

*Primary Examiner* — Harshad R Patel
(74) *Attorney, Agent, or Firm* — Eric Karich

(57) ABSTRACT

A flow meter has a housing having an inlet, an outlet, and a measuring chamber between the inlet and outlet. The measuring chamber has a diameter larger than that of the inlet. A blade section is located between the inlet and the measuring chamber, and the blade section comprises a cylindrical part near the measuring chamber and having a cylindrical inner wall, an expanding part between the cylindrical part and the inlet, and spiral blades which extend from the expanding part to the housing, for imparting the rotational movement to the fluid when the fluid enters the measuring chamber. A ball is positioned in the measuring chamber such that the rotational movement of the fluid moves the ball in a circular motion around the measuring chamber for measuring the flow of the fluid.

2 Claims, 2 Drawing Sheets

ORBITAL BALL FLOWMETER FOR GAS AND FLUID

CROSS-REFERENCE TO RELATED APPLICATIONS

This application for a utility patent is a continuation of a previously filed utility patent, now abandoned, having the application number PCT/NL2007/000248, filed Oct. 7, 2007, which claims priority to Netherlands application NL1032652, filed Oct. 10, 2006.

BACKGROUND OF THE INVENTION

1. Field of the Invention

The invention concerns a flow meter for fluid or gas being the type where the fluid flow or gas flow is made to circulate and the amount of fluid or gas is measured with a circulating ball inside a measuring chamber.

2. Description of Related Art

Flow meters of this kind are known from the publication NL-C-1013231. In this known flowmeter the spiral blades extend substantially in the cylindrical part of the blade section. In this flow meter the fluid is forced into a cylindrical section having spiral blades. The gas or fluid flow is from the inlet first forced from axial to the radial inlet into the cylindrical section which is radial to the measuring chamber. In DE 2910387 the gas or fluid flow is traveling first via radial fins then axial and next centripetal to the measuring chamber. Both applications have the drawback that the flow between inlet and measuring chamber is complicated where the flow will be disturbed and the accuracy will be less. Both flow meters are having considerable flow resistance.

The invention concerns a flow meter which can measure fluid or gas quantities with high accuracy and repeatability. The flow meter is having a low flow resistance by having the blades that makes the gas or fluid rotating in the section where the flow is conducted in one movement from inlet to rotating in the measuring chamber.

By having wide flow passages the flow meter is indifferent for air bubbles and dirt. The amount of the fluid or gas that is flowing through is measured in a known way by detecting optical or magnetic the number of circulations of the ball.

The flow meter has a measuring chamber with a ball where the to be measured medium is put in circulation where the medium is directed radial into the chamber and leaves centripetal the chamber.

SUMMARY OF THE INVENTION

The flowmeter according to the invention is characterized in that the blades extend substantially in the expanding part of the blade section of the housing. The flowmeter according to the present invention can measure fluid or gas quantities with high accuracy and repeatability. The flowmeter is having a low flow resistance by having the blades that makes the gas or fluid rotating in the section where the flow is conducted in one movement from inlet to rotating in the measuring chamber.

By having wide flow passages the flowmeter is indifferent for air bubbles and dirt. The amount of the fluid or gas that is flowing through is measured in a known way by detecting optical or magnetic the number of circulations of the ball.

The flowmeter has a measuring chamber with a ball where the to be measured medium is put in circulation where the medium is directed radial into the chamber and leaves centripetal the chamber.

An embodiment of the flowmeter according to the invention is characterized in that the flowmeter further comprises a core being inside the housing and having a cylindrical wall with openings which are in communication with the outlet, whereby the measuring chamber has the form of a ring and being situated around the core.

A further embodiment of the flowmeter according to the invention is characterized in that the core comprises a flow conducting part which is inside the blade section.

BRIEF DESCRIPTION OF THE DRAWINGS

The invention is described with the help of the drawings.

DETAILED DESCRIPTION OF THE INVENTION

Figure 1:
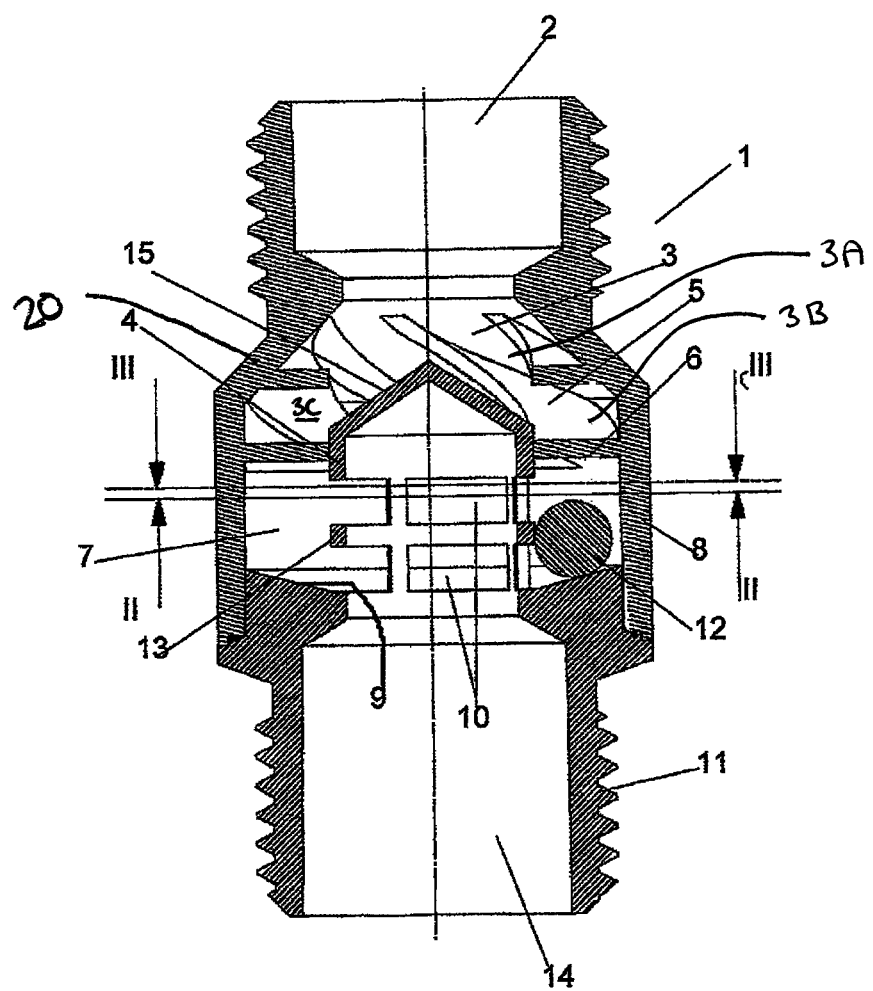
FIG. 1 shows a length wise cross section of the flow meter.
Figure 2:
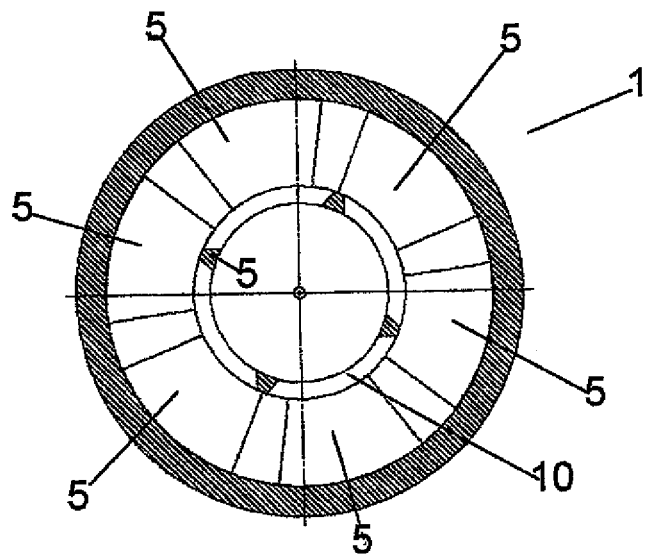
FIG. 2 shows a cross section with view to the blade section.
Figure 3:
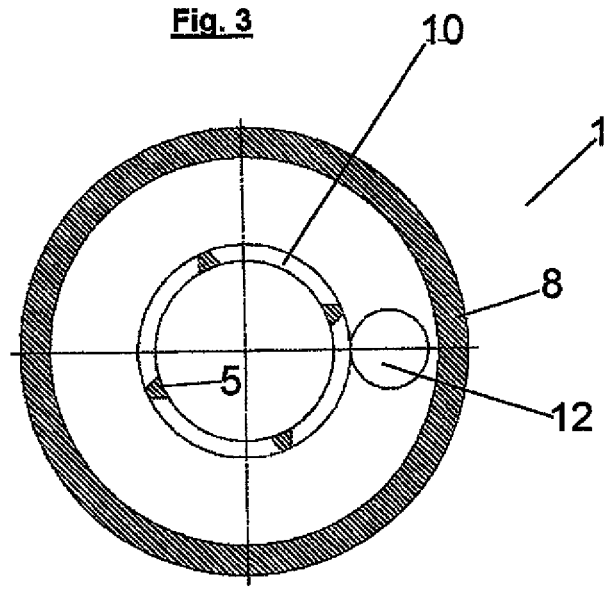
FIG. 3 shows a cross section with view to the outlet.

The above-described drawing figures illustrate the invention, a flow meter (1) for measuring the flow of a fluid (e.g., gas, most liquids, etc.). As illustrated in FIG. 1, the flow meter (1) includes a housing (20) having an inlet (2), an outlet (14), and a measuring chamber (7) therebetween.

A blade section (3) guides the fluid flow to a larger diameter around core (4). Blades (5) are placed in an inclination relative of the centreline of the flow meter (1). Blade section (3) is connected to the measuring chamber (7) at location (6) where the influx out of the blade section (3) is radial into the measuring chamber (7). The measuring chamber is bordered by the outer wall (8) of blade section (3), the conical side wall (9) and the core (4). Core (4) has on site of the measuring chamber (7) openings (10) directed to the center (centripetal). Core (4) and outlet section (11) form constitute a whole and is fitting inside blade section (3). Ball (12) is in measuring chamber (7) and can circulate. Openings (10) in core (4) are divided by ring (13) which is a part of core (4). Ring (13) prevents ball (12) to fall out of the measuring chamber (7). Openings (10) are connected with outlet (14). The blade section (3) includes a cylindrical part (3B) near the measuring chamber (7), the cylindrical part (3B) having a cylindrical inner wall (3C). The blade section (3) also includes an expanding part (3A) between the cylindrical part (3B) and the inlet (2). When measured in the axial direction, the length of the expanding part (3A) of the blade section (3) is larger than the length of the cylindrical part (3B) of the blade section (3).

The operation is as follows: the fluid flows via inlet (2) and is rotated by blades (5). Next the rotating flow fluid reaches the measuring chamber (7). The rotating flow takes ball (12) along. Continuing the fluid flows in the way of a spiral via openings (10) to outlet (14). By giving the ball (12) a specific weight that is nearly the same as the to be measured medium a very accurate measuring can be realised. Core (4) can be foreseen with a conical flow conduction part (15).

What is claimed is:

1. A flowmeter for measuring flow of a fluid, of the type where the fluid flow is directed into rotation movement for measurement, the flowmeter comprising:
 a housing having an inlet, an outlet, and a measuring chamber between the inlet and outlet, the measuring chamber having a diameter larger than that of the inlet;
 a blade section between the inlet and the measuring chamber, the blade section comprising:
  a cylindrical part near the measuring chamber and having a cylindrical inner wall,
  an expanding part between the cylindrical part and the inlet, and spiral blades which extend from the expanding part to the housing, for imparting the rotational movement to the fluid when the fluid enters the measuring chamber; and a ball positioned in the measuring chamber such that the rotational movement of the fluid moves the ball in a circular motion around the measuring chamber for measuring the flow of the fluid;

wherein, measured in the axial direction, the length of the expanding part of the blade section is larger than the length of the cylindrical part of the blade section.

2. A flowmeter for measuring flow of a fluid, of the type where the fluid flow is directed into rotation movement for measurement, the flowmeter comprising:

a housing having an inlet, an outlet, and a measuring chamber between the inlet and outlet, the measuring chamber having a diameter larger than that of the inlet;

an expanding part of the housing between the inlet and the measuring chamber, wherein the diameter increases from a small diameter of the inlet to the larger diameter of the measuring chamber;

a blade section between the inlet and the measuring chamber, the blade section having spiral blades for imparting the rotational movement to the fluid when the fluid enters the measuring chamber, wherein the blade section is located in an expanding part of the housing, such that the fluid is imparted with the rotational movement prior to reaching the measuring chamber; and a ball positioned in the measuring chamber such that the rotational movement of the fluid moves the ball in a circular motion around the measuring chamber for measuring the flow of the fluid;

wherein, measured in the axial direction, the length of an expanding part of the blade section is larger than the length of the cylindrical part of the blade section.

* * * * *